United States Patent
Zamora et al.

(10) Patent No.: US 10,508,767 B2
(45) Date of Patent: Dec. 17, 2019

(54) SYSTEMS AND METHODS FOR MOUNTING ELECTRICAL DEVICE TO JUNCTION BOX

(71) Applicant: Viza Electronics Pte. Ltd., Charlotte, NC (US)

(72) Inventors: Robert Zamora, Huntersville, NC (US); Jack Lula, Burlington (CA); Simon Christopher Smith, Benfleet (GB); Frederic Perry Phillips, Shanghai (CN)

(73) Assignee: Viza Electronics Pte. Ltd., Charlotte, NC (US)

( * ) Notice: Subject to any disclaimer, the term of this patent is extended or adjusted under 35 U.S.C. 154(b) by 0 days.

(21) Appl. No.: 16/031,240

(22) Filed: Jul. 10, 2018

(65) Prior Publication Data
US 2018/0320817 A1    Nov. 8, 2018

Related U.S. Application Data

(62) Division of application No. 15/466,294, filed on Mar. 22, 2017.

(Continued)

(51) Int. Cl.
*F16M 13/02* (2006.01)
*F21V 23/06* (2006.01)
(Continued)

(52) U.S. Cl.
CPC ........ *F16M 13/022* (2013.01); *F16M 13/027* (2013.01); *F21V 21/02* (2013.01); *F21V 23/06* (2013.01); *F21V 23/002* (2013.01)

(58) Field of Classification Search
CPC .... F21V 23/002; F21V 23/06; F21V 19/0055; F21V 21/046; F21V 21/043; F21K 9/20; F21K 9/237; F21S 8/02; F21S 8/026
(Continued)

(56) References Cited

U.S. PATENT DOCUMENTS

2002/0113244 A1 *   8/2002   Barnett ................... F21L 4/027
                                                                257/98
2007/0008716 A1 *   1/2007   Glickman ................ F21S 8/02
                                                                362/147

(Continued)

OTHER PUBLICATIONS

Office Action dated Oct. 7, 2018, for U.S. Appl. No. 15/466,294, Zamora et al., "Systems and Methods for Mounting Electrical Device to Junction Box", 15 pages.

(Continued)

*Primary Examiner* — Christopher M Raabe
(74) *Attorney, Agent, or Firm* — Lee & Hayes, P.C.

(57) ABSTRACT

A system for mounting an electrical device to an electrical junction box may include a mounting plate configured to be coupled to a junction box, and a coupler plate configured to be coupled to the mounting plate and an electrical device. The mounting plate may include at least one a curved slot, and the coupler plate may include at least one pin. The mounting plate and the coupler plate may be configured to be coupled to one another via insertion of the at least one pin into the at least one curved slot, and rotating the coupler plate and the mounting plate relative to one another, so that the at least one pin follows the at least one curved slot and deflects and passes a locking clip of the mounting plate, such that the mounting plate and the coupler plate are coupled to one another.

5 Claims, 11 Drawing Sheets

Related U.S. Application Data

(60) Provisional application No. 62/402,172, filed on Sep. 30, 2016.

(51) Int. Cl.
*F21V 21/02* (2006.01)
*F21V 23/00* (2015.01)

(58) Field of Classification Search
USPC .......................................................... 362/396
See application file for complete search history.

(56) References Cited

U.S. PATENT DOCUMENTS

| | | | | |
|---|---|---|---|---|
| 2009/0135608 A1* | 5/2009 | Sell | ........................ | F21S 8/026 |
| | | | | 362/365 |
| 2012/0266449 A1* | 10/2012 | Krupa | ..................... | F21S 8/043 |
| | | | | 29/592.1 |
| 2014/0160772 A1* | 6/2014 | Wu | ........................ | F21S 8/026 |
| | | | | 362/373 |
| 2014/0268886 A1* | 9/2014 | Schroll | ................. | F21V 29/507 |
| | | | | 362/652 |
| 2015/0338071 A1* | 11/2015 | Feit | ........................ | F21S 8/036 |
| | | | | 362/370 |
| 2016/0320007 A1* | 11/2016 | Araki | ..................... | F21S 8/026 |

OTHER PUBLICATIONS

Office Action dated May 1, 2019, for U.S. Appl. No. 15/466,294, Zamora et al., "Systems and Methods for Mounting Electrical Device to Junction Box", 6 pages.

\* cited by examiner

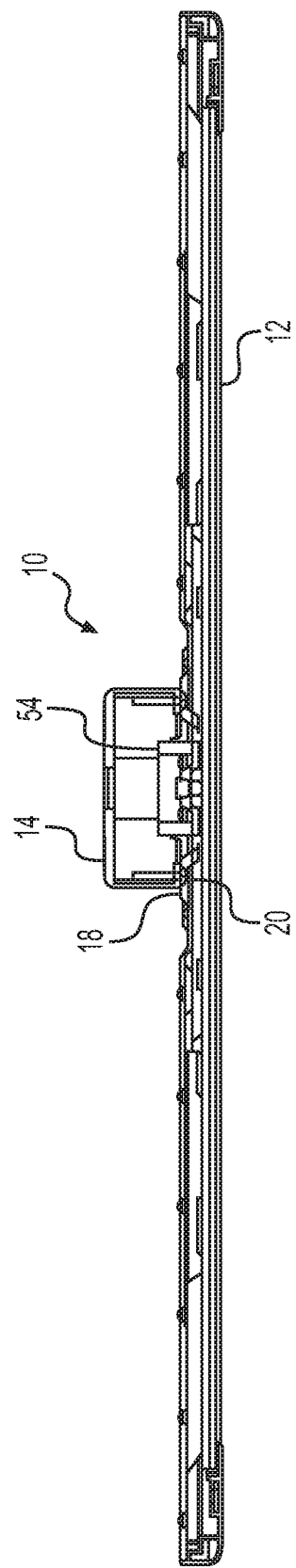

SYSTEMS AND METHODS FOR MOUNTING ELECTRICAL DEVICE TO JUNCTION BOX

RELATED APPLICATIONS

This application is a divisional of and claims the benefit of priority based on U.S. patent application Ser. No. 15/466,294, filed Mar. 22, 2017, which claims the benefit of priority based on U.S. Provisional Application No. 62/402,172, filed Sep. 30, 2016, the disclosures of both of which are hereby incorporated by reference.

BACKGROUND

Electrical devices are often mounted to barriers so that the device can be operated in a convenient location. For example, electrical appliances such as lights and fans are often mounted to the ceiling of rooms so that the benefits of the appliance can be obtained without interfering with floor or wall space of the room. When mounting electrical devices to a barrier such as a ceiling, it may be difficult or cumbersome to both connect any electrical wires to the device and mount the device to the barrier. For example, it may be necessary to drill holes in drywall to obtain access to the wires and mount the device to the barrier. In addition, it may be difficult to hold the device away from the barrier to provide access to the electrical wires from the wall, connect the wires while holding the device, and thereafter mount the device to the barrier. Furthermore, it may be difficult to mount the device to the barrier in the desired orientation, particularly in view of the need to hold the device while connecting the electrical wires. As a result, installation of the electrical device may not be entirely satisfactory.

BRIEF DESCRIPTION OF THE DRAWINGS

The detailed description is described with reference to the accompanying figures. The same reference numbers in different figures indicate similar or identical items.

FIG. 2B is a schematic, side, section view of the example system shown in FIG. 2A.

DETAILED DESCRIPTION

Figure 1:
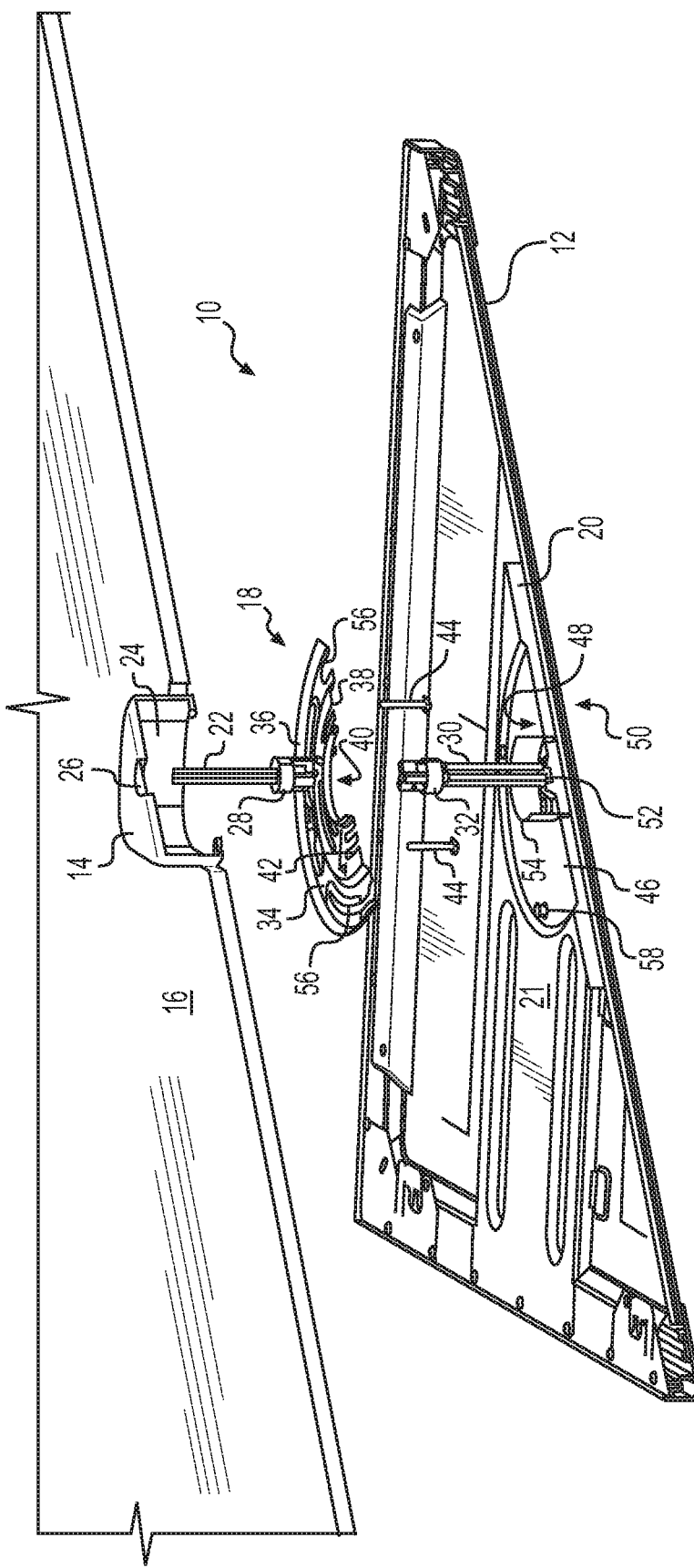
FIG. 1 is a schematic, perspective, exploded, section view of an example system for mounting an electrical device to an electrical junction box.

This disclosure is generally directed to systems and methods for mounting electrical devices to electrical junction boxes. As discussed above, electrical devices are often mounted to, or adjacent, barriers, so that the electrical device can be operated in a convenient location. For example, electrical appliances, such as lights and fans, are often mounted to, or adjacent, the ceiling of a room, so that the benefits of the appliance can be obtained without interfering with floor- or wall-space of the room. When mounting electrical devices to a barrier such as a ceiling, it may be difficult or cumbersome to both connect any electrical wires to the device, and mount the device to the barrier. For example, it may be necessary to drill holes in drywall, or make access holes in suspended ceiling tiles, to obtain access to electrical wires for providing electrical power to the electrical device, and to mount the device to, or adjacent, the barrier. In addition, it may be difficult to support the device below the ceiling before it is mounted, so that the electrical wires may be coupled to the device. In addition, due in part to the cumbersome nature of connecting the electrical wires and mounting the device, it may be difficult to mount the device in a desired orientation relative to the room, for example, so that the device is aligned in the desired manner relative to one or more walls of the room.

The systems and methods disclosed herein may facilitate the electrical connection and mounting of an electrical device to, or adjacent, a barrier such as a ceiling. In some examples, a system for mounting an electrical device to an electrical junction box may include a mounting plate configured to be coupled to a junction box, and a coupler plate configured to be coupled to the mounting plate and an electrical device. The mounting plate may include a base having a first side and a second side. The base may include a service aperture configured to receive at least one wire, at least one fastener aperture configured to receive a fastener for coupling the base to a junction box, and at least one a curved slot for receiving a pin from the coupler plate. The at least one curved slot may define an opening width perpendicular to a tangent to a curve of the at least one curved slot and extending between opposite ends of the at least one curved slot. The opening width of the at least one curved slot may have an enlarged portion, and the mounting plate may further include a locking clip associated with the first side of the base. The coupler plate may include a coupler base having a first side and a second side. The coupler base may include a service aperture configured to receive at least one wire, and at least one pin extending from the first side of the coupler base. The at least one pin may be configured to extend at least partially through the at least one curved slot of the mounting plate. The base of the mounting plate and the coupler base of the coupler plate may be configured to be coupled to one another via insertion of the at least one pin into the at least one curved slot and rotating the coupler base and the base of the mounting plate relative to one another, so that the at least one pin follows the at least one curved slot and deflects and passes the locking clip, such that the second side of the base of the mounting plate and the first side of the coupler base face one another.

In some examples, the enlarged portion of the at least one curved slot may be configured to receive an enlarged portion of the pin therethrough. For example, the at least one pin may include a pin base extending from the first side of the coupler base to a remote pin end, wherein the remote pin end includes the enlarged portion. The enlarged portion of the pin may be configured to fit through the enlarged portion of the at least one curved slot, and the at least one pin and the at least one curved slot may be configured such that when the enlarged portion of the at least one pin is received by the enlarged portion of the at least one curved slot, the enlarged portion of the at least one pin is on the first side of the base of the mounting plate, and the pin base is configured to follow a narrow portion of the at least one curved slot during the rotating.

In some examples, the locking clip may be associated with the first side of the base proximate a narrow portion of the at least one curved slot. The locking clip may include a clip face configured to deflect away from the at least one curved slot in a direction substantially parallel to the first side of the base, for example, as the enlarged portion of the at least one pin passes the locking clip.

In some examples of the coupler plate, the coupler plate may include a flange extending from the first side of the coupler base. The flange may include a continuous wall substantially surrounding the service aperture of the coupler plate. For example, the flange may include a collar, and the collar may be substantially cylindrical. The collar of the coupler plate and the service aperture of the mounting plate may be configured, such that the collar protrudes through the service aperture of the mounting plate when the coupler plate is coupled to the mounting plate. This may facilitate alignment of the coupler plate to the mounting plate. In some examples, the flange may include a receiver aperture configured to receive a hanger, for example, configured to hang the coupler plate from the mounting plate during assembly of the system.

In some examples, the base of the mounting plate is substantially circular. In some examples, the service aperture of the mounting plate is substantially circular and substantially centered in the base. In some examples, the at least one fastener aperture is located between the service aperture of the mounting plate and the at least one curved slot. The at least one curved slot may approximate an arc of a circle. For example, the arc may have a center substantially co-existent with the center of the base of the mounting plate, for example, when the base is substantially circular.

In some examples, the enlarged portion of the opening width may be located at a first opposite end of the at least one curved slot, and the locking clip may be located between the enlarged portion of the opening width and a second opposite end of the at least one curved slot. In some examples, the first side of the base may include a raised portion adjacent the at least one curved slot between the locking clip and a second opposite end of the at least one curved slot.

In some examples, the locking clip may include a boss coupling the clip face to the first side of the base. The clip face may extend away from the boss and terminate at an end remote from the boss. In some examples, the clip face may be configured, such that the remote end of the clip face is biased toward the at least one curved slot and deflects in the direction substantially parallel to the first side of the base and away from the at least one curved slot, for example, when the enlarged portion of the pin passes the clip face.

In some examples, the mounting plate may further include a friction clip associated with the second side of the base, and the friction clip may extend away from the second side of the base. For example, the friction clip may extend obliquely away from the second side of the base and may include a remote end spaced from the second side of the base. The remote end of the friction clip may be configured to deflect toward the second side of the base. The friction clip may be configured to press against the coupler base when the coupler plate is engaged with the mounting plate. This may serve to pull the enlarged portion of the pin against the first side of the base of the mounting plate and prevent the coupler plate from loosely moving relative to the mounting plate.

In some examples, the second side of the base of the mounting plate may include a plurality of alignment indicia configured to facilitate alignment of the mounting plate relative to another structure, such as, for example, a wall of the room or space in which the electrical device is being installed. In some examples, at least one of the first or second sides of the base of the mounting plate may include mounting indicia configured to indicate that the second side of the base is configured to face away from the junction box when coupled to the junction box.

In some examples, the coupler base may include an adaptor configured to be coupled to an electrical device. For example, the adaptor may be configured to be coupled to a light panel.

This disclosure is also generally directed to a method for mounting an electrical device to a junction box. The method may include coupling a mounting plate to the junction box, and coupling at least one electrical wire from the junction box to at least one electrical wire of the electrical device. The method may also include moving a coupler plate coupled to the electrical device toward the mounting plate, and passing at least one pin of the coupler plate at least partially through a slot in the mounting plate, such that a side of the mounting plate and a side of the coupler plate are facing one another. The method may also include rotating the coupler plate relative to the mounting plate, such that the coupler plate and the mounting plate are engaged with one another via engagement between the at least one pin of the coupler plate and the mounting plate.

In some examples of the method, the at least one pin may include an enlarged portion at a remote end of the at least one pin, and the at least one slot may include an enlarged portion. Passing the at least one pin of the coupler plate at least partially through the slot in the mounting plate may include passing the enlarged portion of the at least one pin through the enlarged portion of the at least one slot. In some examples, the mounting plate may include at least one locking clip associated with the at least one slot, and rotating the coupler plate relative to the mounting plate may cause the enlarged portion of the at least one pin to pass the locking clip. In some examples, the locking clip may prevent the enlarged portion of the pin from unintentionally becoming dis-engaged from the at least one slot.

In some examples of the method, the method may further include coupling a hanger to the mounting plate and the coupler plate to support the coupler plate from the mounting plate via the hanger before coupling the at least one electrical wire from the junction box to the at least one electrical wire of the electrical device. In such examples, the method may also include de-coupling the hanger from the mounting plate and the coupler plate after coupling the at least one electrical wire from the junction box to the at least one electrical wire of the electrical device.

Some examples of the method may also include adjusting the relative orientation of the electrical device relative to the mounting plate by rotating the electrical device relative to the mounting plate. This may be facilitated by the length of the at least one slot providing clearance for the at least one pin to move relative to the at least one slot without becoming disengaged from the at least one slot, for example, by the enlarged portion of the at least one pin passing the locking clip and entering a narrow portion of the at least one slot. This example adjusting step may provide the ability to achieve a desired alignment of the electrical device relative to another item in the room or space in which the electrical device is being mounted, such as, for example, other electrical devices and/or a wall of the room or space.

FIG. 1 is a schematic, perspective, exploded, section view of an example system 10 for mounting an electrical device 12 to an electrical junction box 14. In the example shown, the electrical junction box 14 is fixed to, or adjacent, a barrier 16. The barrier 16 may be any type of barrier, such as, for example, a ceiling, wall, or floor. The ceiling may be a suspended ceiling or a ceiling formed by drywall attached to supports such as joists. The junction box 14 may be attached directly to the barrier 16 or may be attached via one or more intermediate supports, such as, for example, studs or joists. In some examples, the junction box 14 may be configured to support the weight of the electrical device 12. The junction box 14 may be formed from plastic or metal, a combination thereof, or any other suitable known materials. The electrical device 12 may be any electrical appliance, such as, for example, a light fixture for an incandescent or fluorescent light, a light panel such as an LED light panel as shown in FIG. 1, or a fan such as a ceiling fan or ventilator fan. Other types of electrical devices are contemplated.

As shown in FIG. 1, the example system 10 includes a mounting plate 18 configured to be coupled to the junction box 14 and a coupler plate 20 configured to be coupled to the mounting plate 18 and the electrical device 12. In some examples, the system 10 may also include an adaptor 21 configured to couple the coupler plate 20 and the electrical device 12 to one another. In some examples, the coupler plate 20 may be coupled directly to the electrical device 12, for example, such that the coupler plate 20 is an integrated part of the electrical device 12.

In the example shown, the junction box 14 provides access to electrical supply wires 22 configured to supply electrical power to the electrical device 12. In particular, the example junction box 14 includes a cup-shaped housing 24 having a supply aperture 26 configured to provide an entry point for the supply wires 22 to extend from behind the barrier 16, through the supply aperture 26, and into the housing 24. In the example shown, the supply wires 22 include an electrical connector 28 coupled to the remote end of the supply wires 22. The example electrical device 12 includes electrical device wires 30 for receiving electrical power for the electrical device 12 and having a corresponding electrical connector 32 configured to be coupled to the electrical connector 28 of the supply wires 22 shown extending from the junction box 14 in the unassembled state shown in FIG. 1. Following complete assembly of the system 10, the supply wires 22, device wires 30, and the corresponding connectors 28 and 32 will be contained within the housing 24, which will be substantially or fully closed via the mounting plate 18, for example, as shown in FIG. 2B.

Figure 2A:
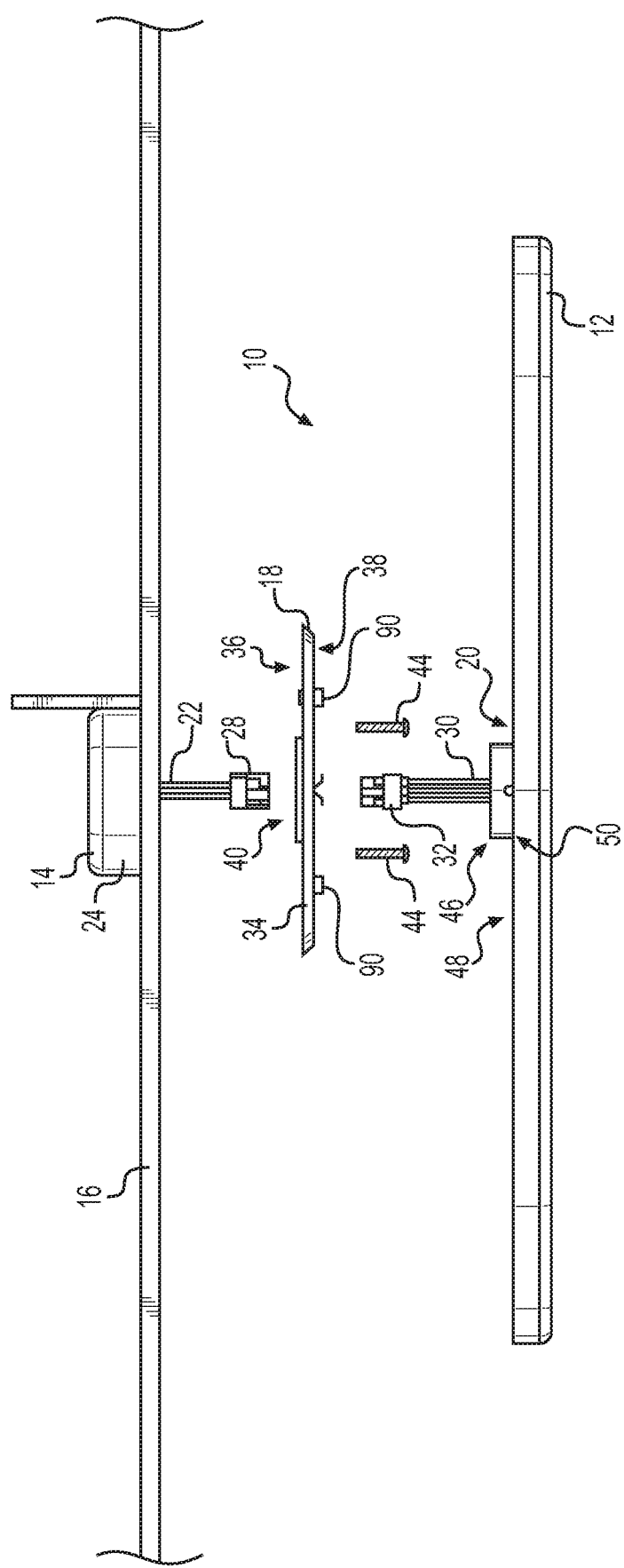
FIG. 2A is a schematic, exploded, side view of the example system shown in FIG. 1.

In the example shown in FIGS. 1 and 2A, the mounting plate 18 includes a base 34 having a first side 36 and a second side 38. The first side 36 is configured to face the housing 24 when assembled to the housing 24, and the second side 38 is configured to face the coupler plate 20 when the coupler plate 20 is assembled to the mounting plate 18. The example base 34 includes a service aperture 40 configured to receive the supply wires 22 therethrough, and one or more fastener apertures 42 configured to receive one or more fasteners 44 for coupling the base 34 to the junction box 14. The example shown includes two fasteners 44, but fewer or more fasteners 44 are contemplated, and fewer or more fastener apertures 42 are contemplated. The example fasteners 44 shown are threaded fasteners configured to be threadedly received by the junction box 14. Other types of fasteners are contemplated.

In the example shown, the mounting plate 18 is configured to be coupled directly to the junction box 14 without any intermediate structural components coupled to the mounting plate 18 or the junction box 14. The use of intermediate structural components is contemplated. In addition, the presence of gaskets, seals, and/or sealants is contemplated, but such gaskets, seals, and sealants are not considered to provide an intermediate structural component.

The example coupler plate 20 includes a coupler base 46 having a first side 48 and a second side 50. When assembled to the mounting plate 18, the first side 48 of the coupler base 46 faces the second side 38 of the base 34 of the mounting plate 18, and the second side 50 of the coupler base 46 faces the electrical device 12. In the example shown, the coupler base 46 includes a service aperture 52 configured to receive the device wires 30 therethrough. The coupler base 46 also includes a flange 54 extending from the first side 48 of the coupler base 46 adjacent the service aperture 52. In the example shown, the flange 54 includes a continuous wall substantially surrounding the service aperture 52. For example, the continuous wall may take the form of a collar, which may be substantially cylindrical, that substantially surrounds the service aperture 52, for example, as shown in FIG. 1.

In some examples, the flange 54 may be a substantially cylindrical collar configured to fit within the service aperture 40 of the base 34 of the mounting plate 18. In such configurations, the flange 54 may be configured to assist with aligning the mounting plate 18 and coupler plate 20 with one another to ease assembly of the coupler plate 20 to the mounting plate 18. For example, the service aperture 40 of the base 34 of the mounting plate 18 may have a size and/or shape (e.g., a circular shape) corresponding to the cross-sectional size and/or shape of the flange 54 (e.g., circular when the flange 54 is cylindrical). As explained in more detail below, the cylindrical flange 54 may be configured to pass through and rotate within the service aperture 40.

Figure 3A:
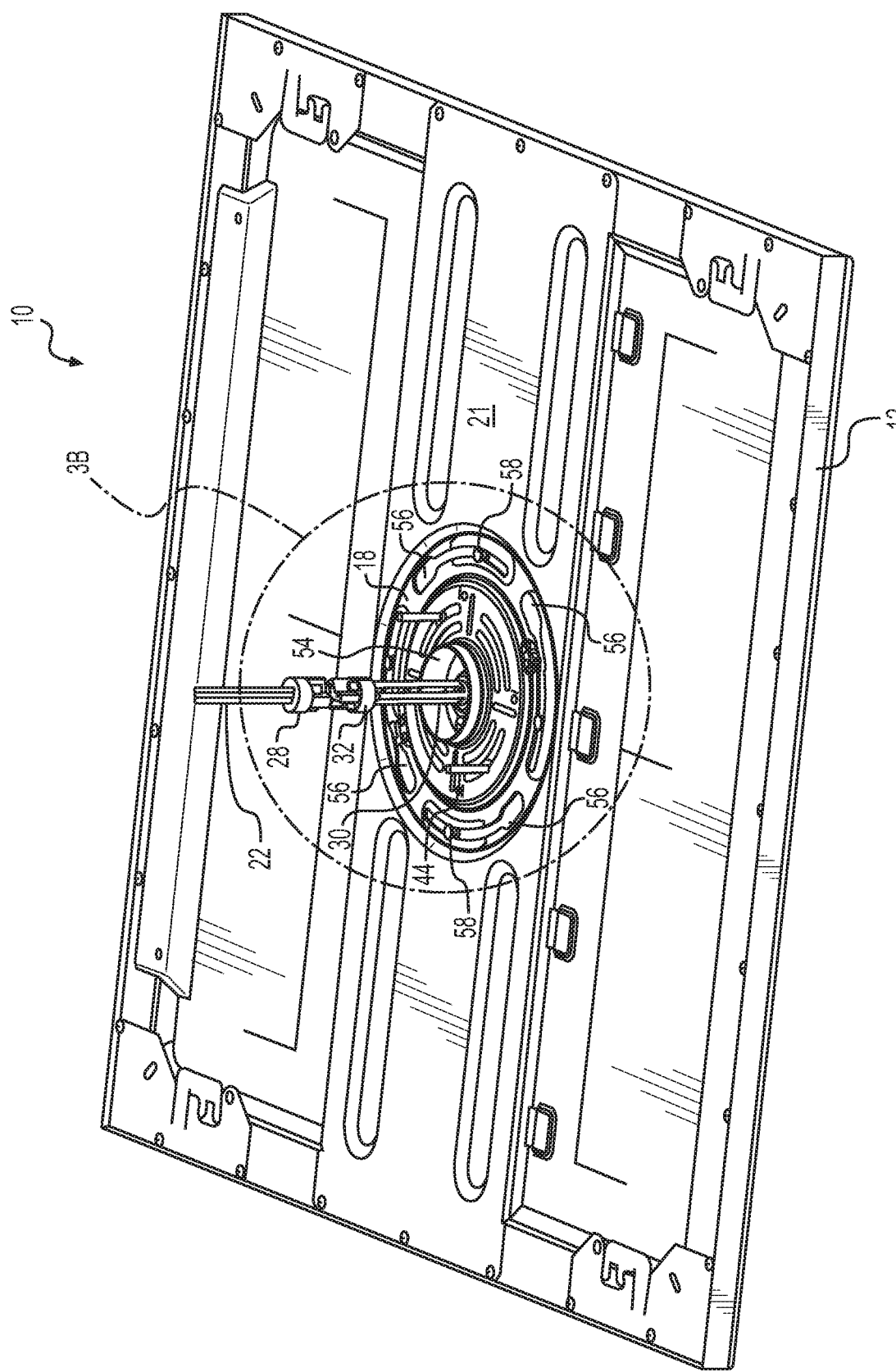
FIG. 3A is a schematic, perspective view of the example system shown in FIG. 2B.
Figure 3B:
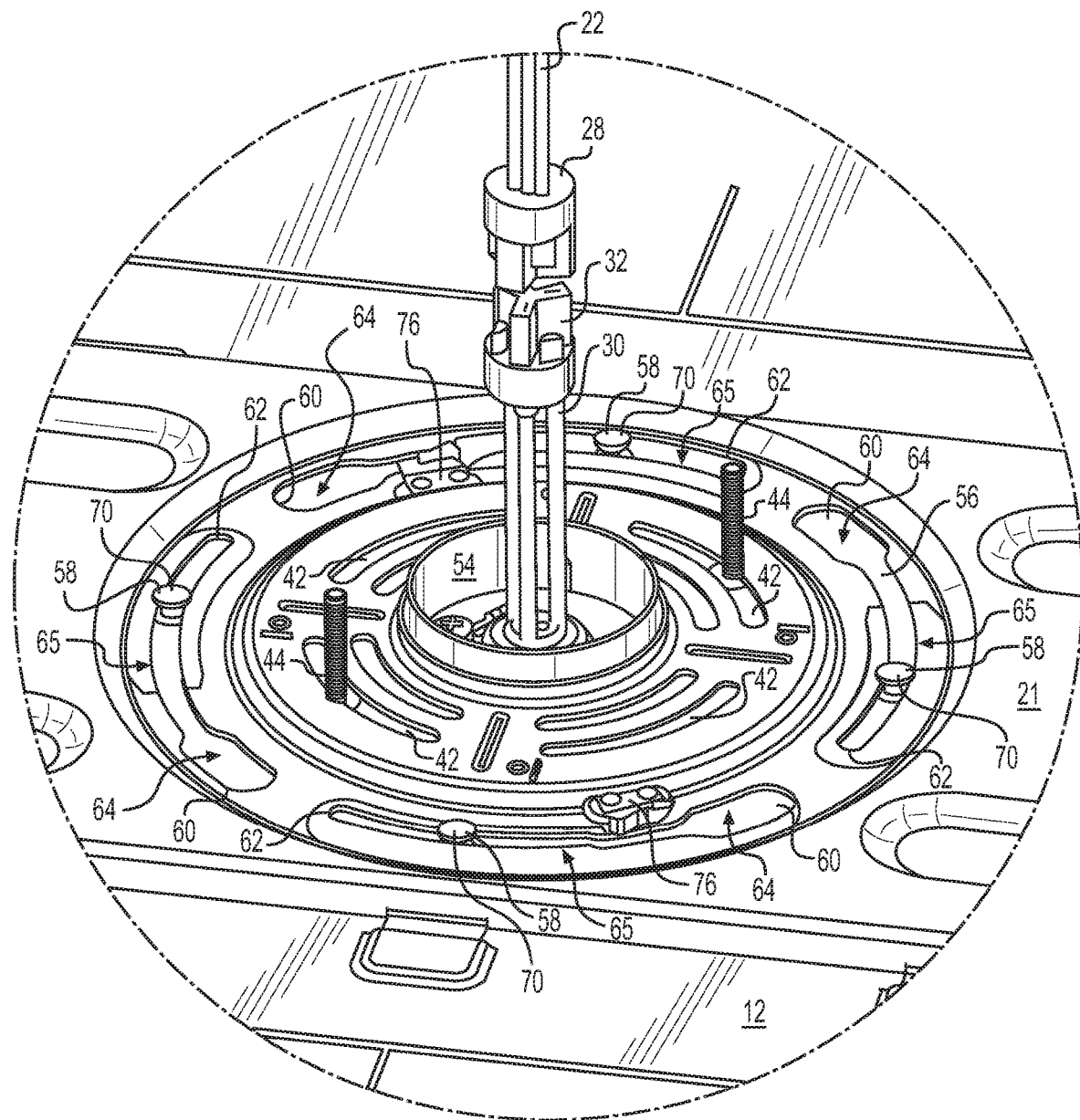
FIG. 3B is a schematic, detail view taken from FIG. 3A.
Figure 5A:
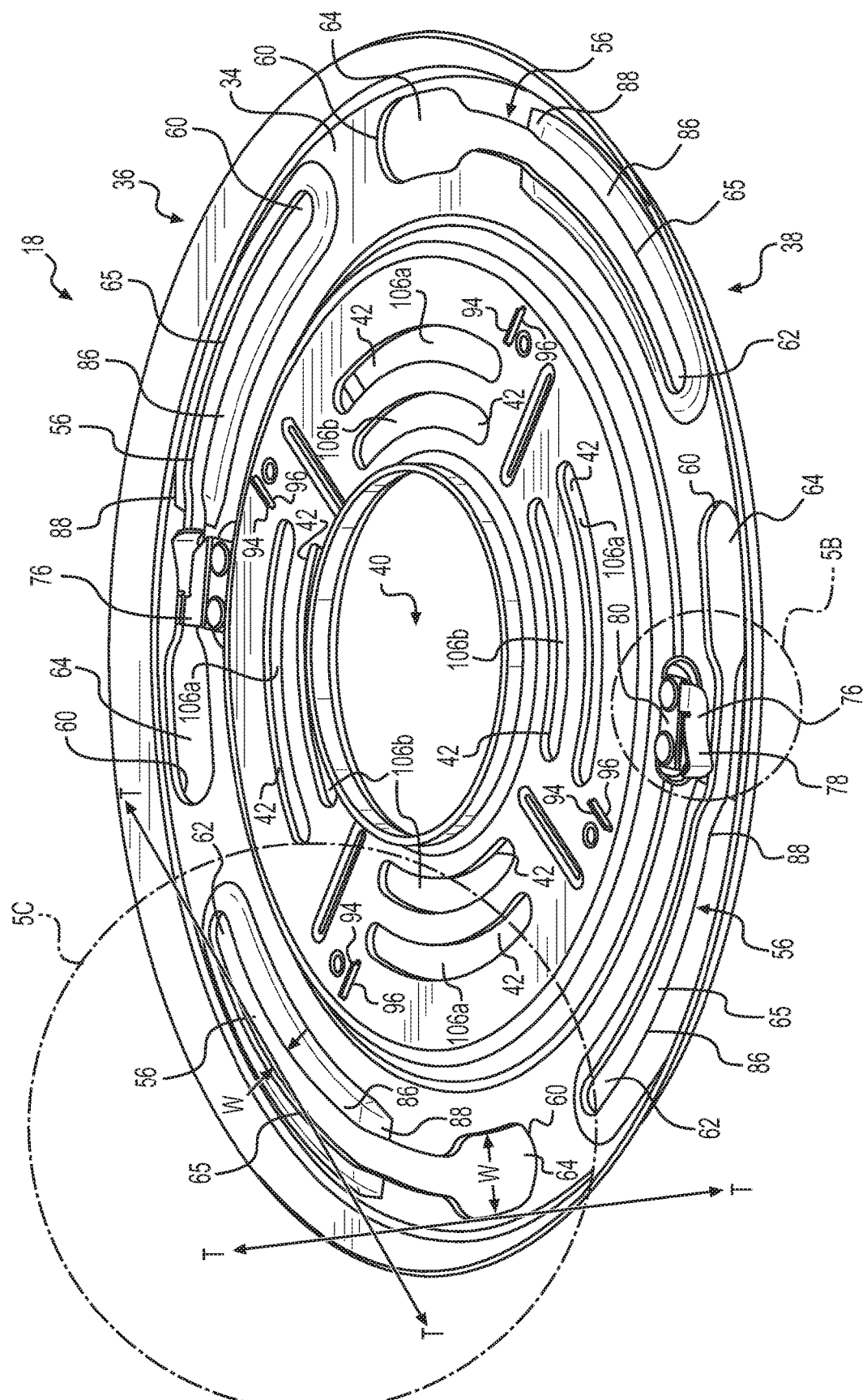
FIG. 5A is a schematic, perspective view of an example mounting plate showing a first side of the mounting plate.
Figure 5B:
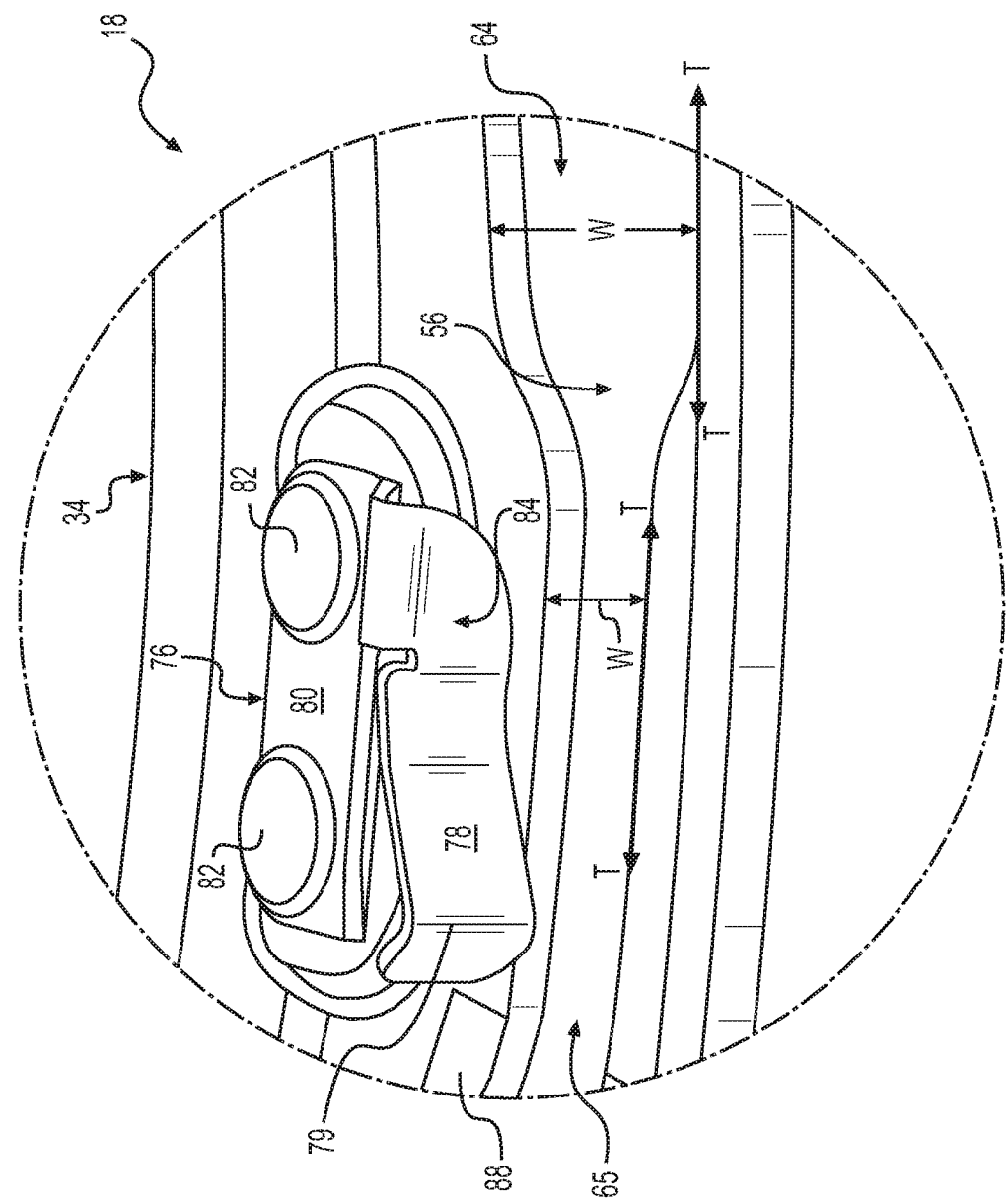
FIG. 5B is a schematic, detail view taken from FIG. 5A.
Figure 5C:
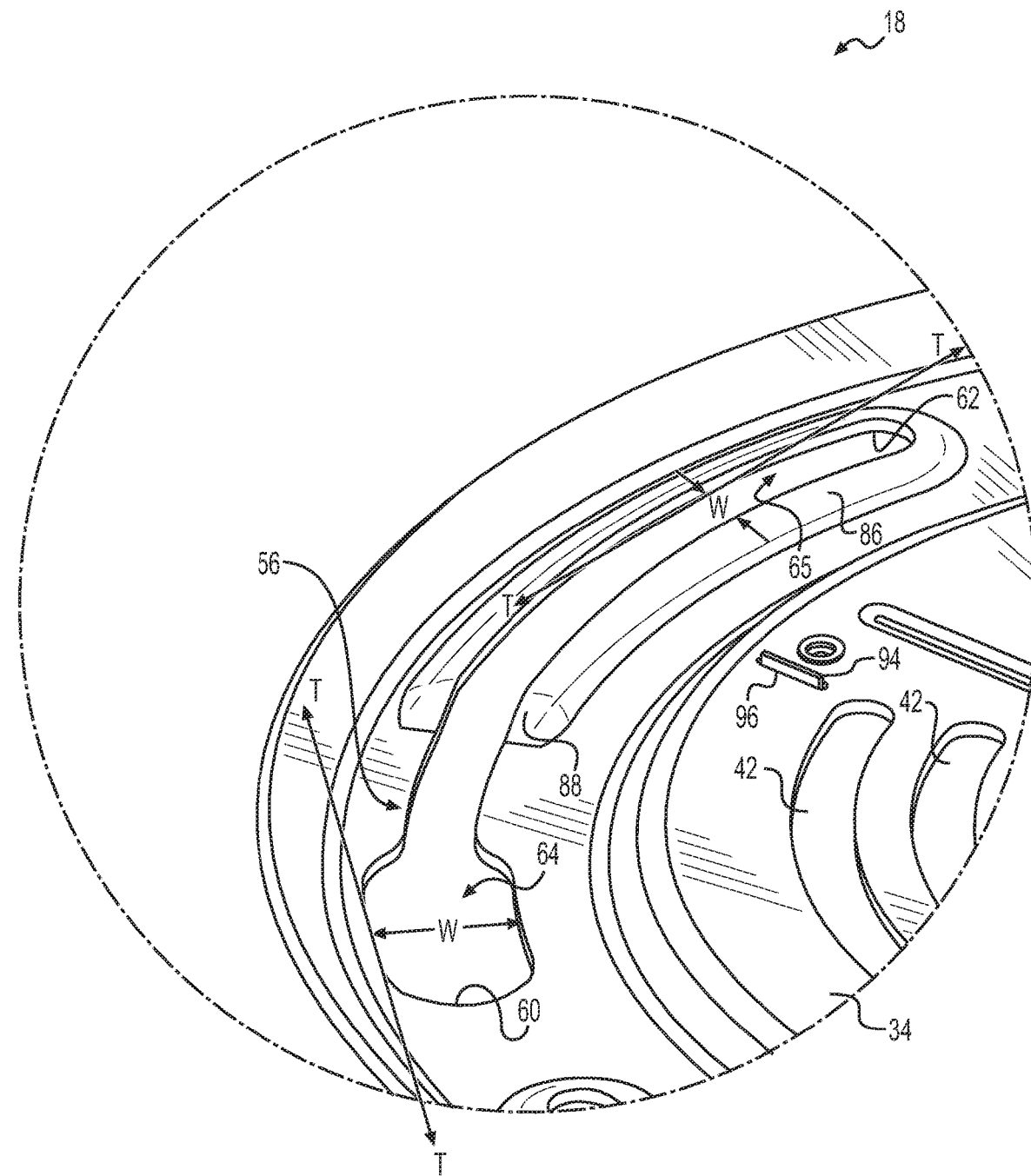
FIG. 5C is a schematic, detail view taken from FIG. 5A.

As shown in FIGS. 1, 3A, and 3B, the example base 34 of the mounting plate 18 may include one or more curved slots 56, and the coupler base 46 of the coupler plate 20 may include one or more pins 58. For example, the example curved slots 56 are configured to receive a respective pin 58 of the coupler plate 20. As shown in FIGS. 5A-5C, the curved slots 56 defines an opening width W perpendicular to a tangent T to a curve of the slot 56 and extending between opposite ends 60 and 62 thereof. In the example shown, the opening width W of the curved slot 56 includes a relatively enlarged portion 64 and a relatively narrow portion 65 extending between the opposite ends 60 and 62 of the curved slot 56. The curved slots 56 may approximate an arc of a circle. For example, the arc may have a center substantially co-existent with the center of the base 34 of the mounting plate 18, for example, when the base 34 is substantially circular.

Figure 4:
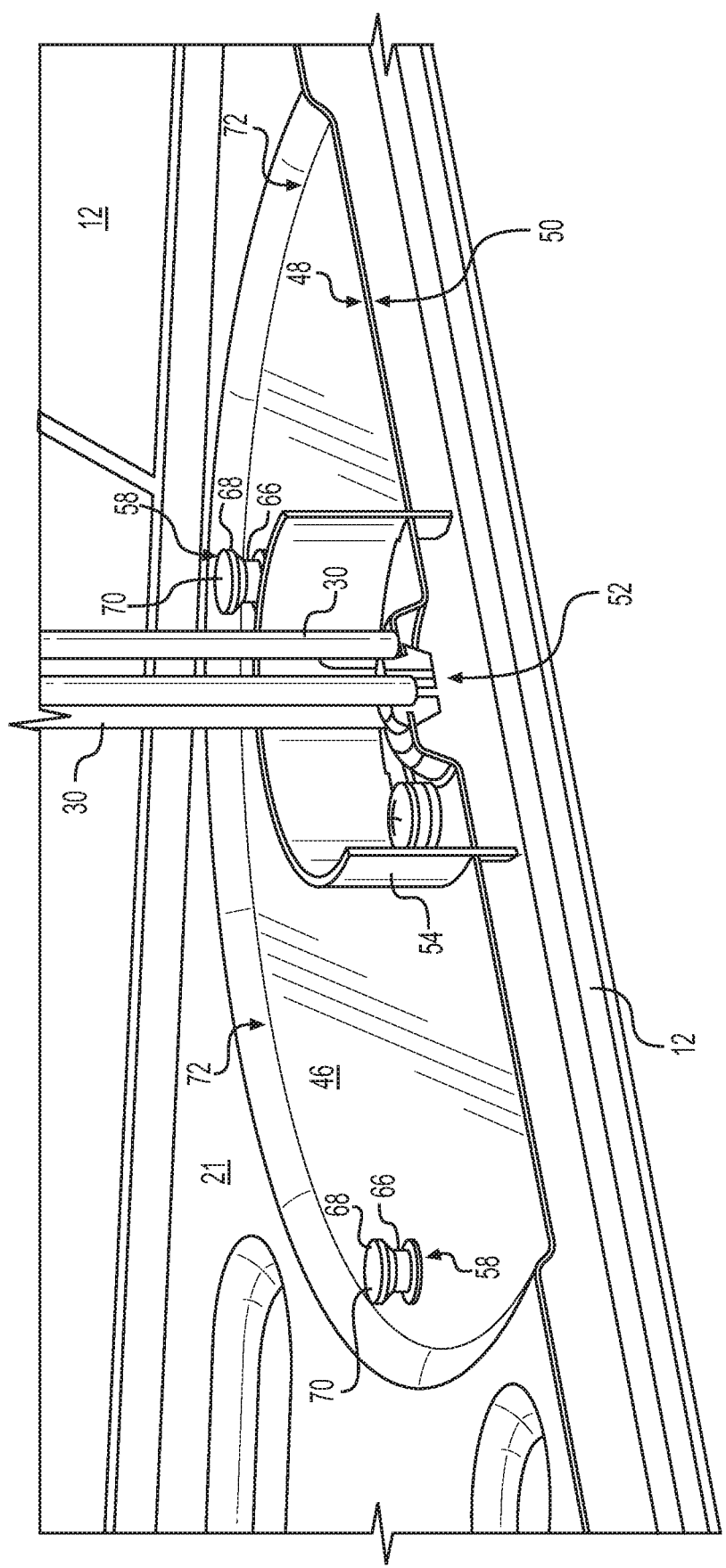
FIG. 4 is a schematic, partial, perspective, section view of an example coupler plate and example electrical device.

FIG. 4 is a schematic, partial, perspective, section view showing an example coupler plate 20 and electrical device 12. In the example shown, the pins 58 of the coupler base 46 of the coupler plate 20 extend from the first side 48 of the coupler base 46 and are configured to extend partially though one of the curved slots 56 of the base 34 of the mounting plate 18 when the coupler plate 20 is assembled to the mounting plate 18. In some examples, the pins 58 include a pin base 66 extending from the first side 48 of the coupler base 46 to a remote pin end 68. As shown in FIG. 4, the pin end 68 has an enlarged portion 70 that has a cross-section that is larger than the cross-section of the pin base 66, thereby providing a mushroom-shaped pin.

In some examples, such as shown in FIG. 4, the coupler base 46 also defines a coupler recess 72, for example, a circular recess, configured to receive the base 34 of the mounting plate 18. As shown, for example, in FIGS. 1 and 3B, the base 34 of the mounting plate 18 and the coupler base 46 of the coupler plate 20 are configured to be coupled to one another via insertion of one or more pins 58 into one or more of the curved slots 56 and twisting of the base 34 and the coupler base 46 relative to one another, so that respective ones of the one or more pins 58 follow the curved slots 56. For example, as shown, the respective enlarged portions 64 of the curved slots 56 are configured to receive the respective enlarged portions 70 of the pins 58 therethrough, such that the enlarged portions 70 of the pins 70 are configured to fit through the enlarged portions 64 of the curved slots 56. In the example shown, the pins 58 and the curved slots 56 are configured such that when the enlarged portion 70 of the pin 58 is received by the enlarged portion 64 of the curved slot 56, the enlarged portion 70 of the pin 58 is on the first side 36 of the base 34 of the mounting plate 18, and the pin base 66 is configured to follow a narrow portion 65 of the curved slot 56 as the mounting plate 18 and the coupler plate 20 are rotated or twisted with respect to one another. The enlarged portion 70 of the pin 58, being on the first side 36 of the base 34 of the mounting plate 18, and the coupler base 46 being on the second side 38 of the base 34 of the mounting plate 18, serves to hold the coupler plate 20 and the mounting plate 18 together, such that the first side of the coupler plate 20 is adjacent and faces the second side 38 of the base 34 of the mounting plate 18, for example, as shown in FIG. 1.

In such examples, in order to mount the coupler plate 20 to the mounting plate 18, the coupler plate 20 is aligned with the mounting plate 18, such that the flange 54 is aligned with the service aperture 40 of the base 34 of the mounting plate 18, and the coupler plate 20 is oriented relative to mounting plate 18, such that the enlarged portions 70 of the pins 58 are aligned with the enlarged portions 64 of the curved slots 56. The first side 48 of the coupler plate 20 is moved toward the second side 38 of the mounting base 18 until the enlarged portions 70 of the pins 58 pass through the enlarged portions 64 of the curved slots 56. The coupler plate 20 is then rotated or twisted relative to the mounting plate 18, such that the pins 58 follow the curved slots 56 from one opposite end 60 toward the other opposite end 62, at least until the pins 58 reach the narrow portions 65 of the curved slots 56, so that the enlarged portions 70 of the pins 58 serve to hold the coupler plate 20 and the mounting plate 18 together.

As shown in FIGS. 5A and 5B, some examples of the mounting plate 18 may include one or more locking clips 76 associated with the first side 36 of the base 34, for example, proximate the narrow portions 65 of the opening width W of the curved slots 56. In the example shown, the locking clips 76 include a clip face 78 extending away from the first side 36 of the base 34 and configured to deflect away from the curved slot 56 in a direction substantially parallel to the first side 36 of the base 34 and toward the service aperture 40 of the base 34 of the mounting plate 18. In some examples, the locking clip 76 is located between the enlarged portion 64 and the opposite end 62 of the curved slot 56.

In the example shown in FIGS. 5A-5C, the locking clips 76 include a clip base 80 coupled to the base 34 of the mounting plate 18 by two clip fasteners 82. The clip fasteners 82 may be any type of fastener, such as, for example, screws, bolts, and/or rivets. Welding and/or adhesively securing the clip base 80 to the base 34 of the mounting plate 18 is also contemplated. In some examples, the clip face 78 may be formed by a clip tongue 84 extending from the clip base 80, for example, as shown in FIGS. 5A and 5B.

In the example shown, when the enlarged portions 70 of the pins 58 are received by the respective enlarged portions 64 of the curved slots 56, the enlarged portions 70 of the pins 58 are on the first side 36 of the base 34 of the mounting plate 18, and the pin bases 66 are configured to follow the narrow portions 65 of the curved slots 56 as the mounting plate 18 and the coupler plate 20 are rotated or twisted with respect to one another. As the coupler plate 20 is twisted relative to the mounting plate 18, the each of the enlarged portions 70 of the pin 56 engages the respective clip face 78 of the locking clip 76 and deflects it toward the center of the base 34 of the mounting plate 18, until the enlarged portion 70 passes the apex 79 (see FIG. 5B) of the clip face 78, after which the clip face 78 rebounds and returns to its predeflected position. Once past the apex 79, the enlarged portion 70 of the pin 58 is prevented from returning to the enlarged portion 64 of the curved slot 56, unless the enlarged portion 70 of the pin 58 is forced past the apex 79. In this example manner, the locking clips 76 are configured to prevent the pins 58 from becoming unintentionally separated from the curved slots 56 after the coupler plate 20 is assembled to the mounting plate 18.

In some examples, for example as shown in FIGS. 5A-5C, the narrow portion 65 of each of the curved slots 56 is configured to provide adjustment of the relative orientation of the coupler plate 20 to the mounting plate 18 following assembly of the coupler plate 20 to the mounting plate 18. For example, the narrow portions 65 of the curved slots 56 have sufficient length for the pins 58 to permit rotation of the coupler plate 20 relative to the mounting plate 18. For example, the narrow portions 65 of the curved slots 56 may each have a length sufficient for the coupler plate 20 to move an amount ranging from about 1 to about 30 degrees relative to the mounting plate 18. For example, the narrow portions 65 of the curved slots 56 may each have a length sufficient for the coupler plate 20 to move an amount ranging from about 5 to about 20 degrees, from about 5 to about 15 degrees, or from about 5 to about 10 degrees, relative to the mounting plate 18. This example configuration may provide for adjustment of the orientation of the coupler plate 20 and the electrical device 12 coupled thereto following assembly of the mounting plate 18 to the junction box 14 and the assembly of the coupler plate 20 to the mounting plate 18. This may facilitate ease of alignment of the electrical device 12 relating to the barrier 16 and other structures in a space (e.g., a room) in which the electrical device 12 is mounted via the system 10.

The example mounting plate 18 shown FIGS. 5A-5C also includes raised portions 86 adjacent the curved slots 56 on the first side 36 of the base 34, for example, extending from the locking clips 76 to the opposite ends 62 of the curved slots 56, which substantially coincides with the narrow portions 65 of the curved slots 56. As shown in FIG. 5C, for example, the raised portions 86 may include ramps 88 on each side of the curved slots 56 that provide a transition between the base 34 and apexes of the raised portions 86. The example ramps 88 and raised portions 86 are configured such that as the enlarged portions 70 of the pins 58 travel along the curved slots 56, the enlarged portions 70 are guided up the ramps 88 and along the raised portions 86.

Figure 6:
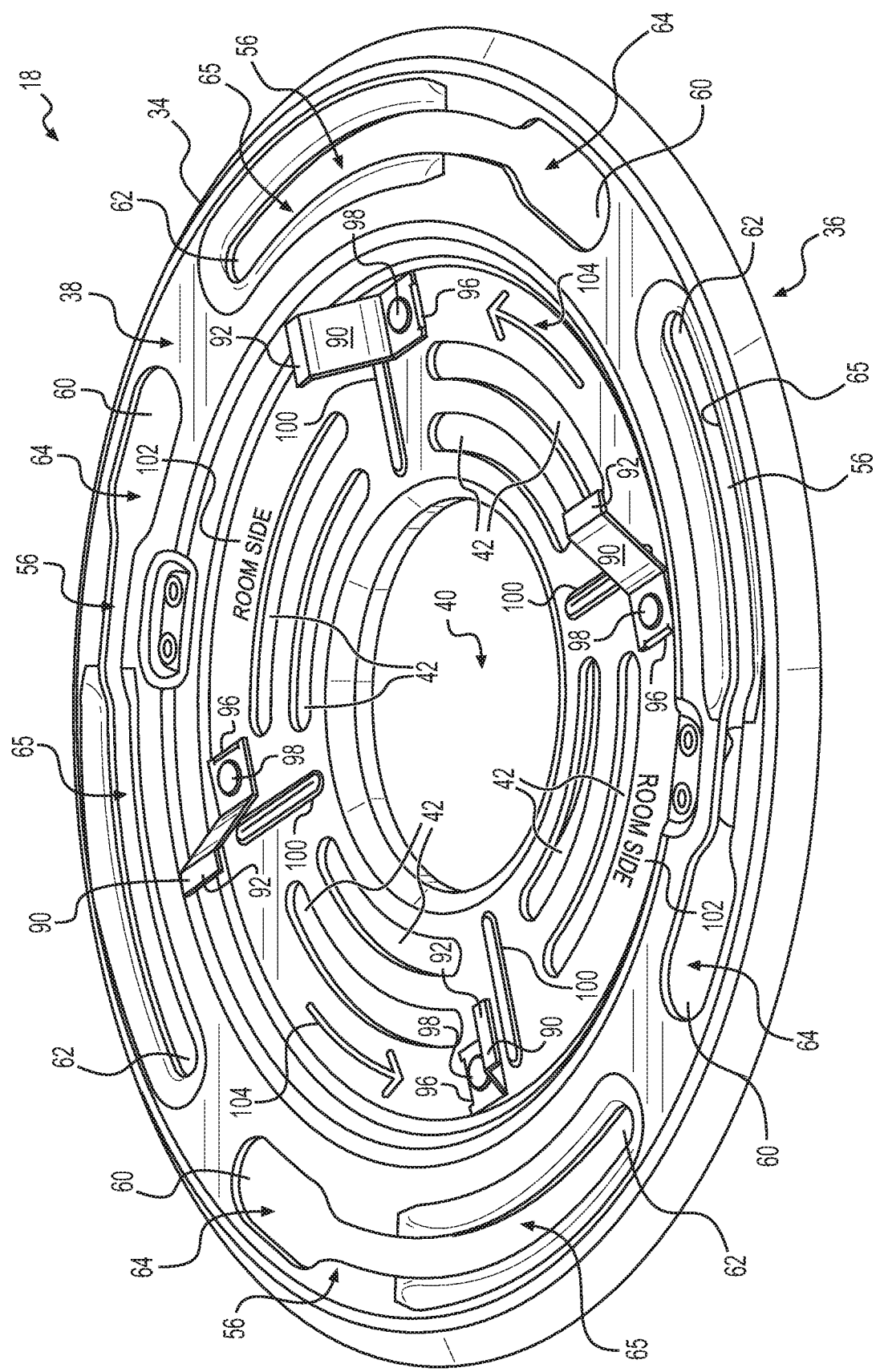
FIG. 6 is a schematic, perspective view of an example mounting plate showing a second side of the mounting plate.

As shown in FIG. 6, the example mounting plate 18 may also include friction clips 90. For example, the friction clips 90 may be associated with the second side 38 of the base 34 of the mounting plate 18. In the example shown, the friction clips 90 extends away from the second side 38 of the base 34. For example, the friction clips 90 extend obliquely away from the second side 38 and may include a remote end 92 spaced from the second side 38 of the base 34. In the example shown, the remote end 92 of the friction clip 90 is configured to deflect toward the second side 38 of the base 34 when the coupler base 46 is moved toward the second side 38 of the base 34 of the mounting plate 18, thereby providing a cantilever spring biased against the first side 48 of the coupler base 46. The friction clips 90 may be configured to increase the friction force opposing movement of the pins 58 in the curved slots 56. For example, during mounting of the coupler plate 20 to the mounting plate 18, the first side 48 of the coupler base 46 is moved toward the second side 38 of the base 34 of the mounting plate 18, deflecting the remote ends 92 of the friction clips 90 toward the second side 38. As a result, the friction clips 90 press against the coupler base 46 and resist movement of the coupler base 46 as the coupler base 46 is rotated relative to the base 34 of the mounting plate 18. For example, during assembly of the coupler plate 20 to the mounting plate 18, the enlarged portions 70 of the pins 58 pass through the enlarged portions 64 of the curved slots 56, and as the coupler plate 20 is rotated or twisted relative to the mounting plate 18, the enlarged portions 70 of the pins 58 slide up the ramps 88 and onto the raised portions 86 of the base 34 located on the first side 36 of the base 34. This pulls the coupler base 46 against the friction clips 90, thereby deflecting the remote ends 92 of the friction clips 90 toward the second side 38 of the base 34, which increases the friction force resisting relative movement between the coupler base 46 and the base 34 of the mounting plate. This example configuration may serve to prevent the coupler plate 46 from loosely rotating relative to the base 34 of the mounting plate 18 after the coupler plate 20 and the mounting plate 18 have assembled to one another.

In some examples, as shown FIGS. 5C and 6, the friction clips 90 may be formed by a relatively flat strip of material, such as, for example, metal or plastic, that forms a distorted z-shape in cross-section, and which is attached to and extends from the second side 38 of the base 34 of the mounting plate 18. In some examples, the friction clips 90 may include a short root portion 94 configured to fit in a corresponding slot 96 in the base 34 of the mounting plate 18, for example, as shown in FIGS. 5C and 6. The root portion 94 and slot 96 are configured to locate the friction clip 92, which may be coupled to the base 34 via welding, adhesives, and/or fasteners, such as screws, bolts, and/or rivets. In the example shown, the friction clips 92 are coupled to the base 34 via friction clip fasteners 98.

As shown in FIG. 5C, some examples of the mounting plate 18 include indicia for assisting mounting and assembly of the system 10. For example, the second side 38 of the base 34 of the mounting plate 18 may include one of more of alignment indicia 100, side indicia 102, and rotation indicia 104. For example, the alignment indicia 100 may include one more marks configured to assist the alignment of the mounting plate 18 relative to other structures in the space or room, such as, for example, walls. As shown, the example alignment indicia 100 are radially extending straight marks provided at ninety degrees relative to one another. The example side indicia 102 provide an indication that the second side 38 of the base 34 should face away from the junction box 14 to which the mounting plate 18 is being mounted. As shown, the example side indicia 102 may indicate "ROOM SIDE" (or similar) to advise that the mounting plate 18 should be mounted to the junction box 14 with the second side 38 of the base 34 facing out into the room. The example rotation indicia 104 shown in FIG. 5C provide arrows depicting the direction of rotation of the coupler plate 20 relative to the mounting plate 18, so that the enlarged portions 70 of the pins 58 follow the curved slots 56 from the enlarged portions 64, past the locking clips 76, and into the narrow portions 65 of the curved slots 56. One or more of the alignment indicia 100, side indicia 102, and rotation indicia 104 may take the forms of, for example, stampings, moldings, engravings, printing, and/or stickers. Other types and forms of indicia are contemplated.

As shown, for example, in FIGS. 3B and 5A, the fastener apertures 42 of the mounting plate 18 may take the form of fastener slots positioned between the curved lots 56 and the service aperture 40, and configured to receive the one or more fasteners 44. In some examples, the base 34 of the mounting plate 18 may include outer fastener slots 106a and inner fastener slots 106b (see FIG. 5A). This example configuration of the fastener slots 106a and 106b may serve to enable the mounting plate 18 to be coupled to junction boxes having different configurations and/or different locations for receiving the fasteners 44 that couple the mounting plate 18 to the junction box 14.

Figure 7:
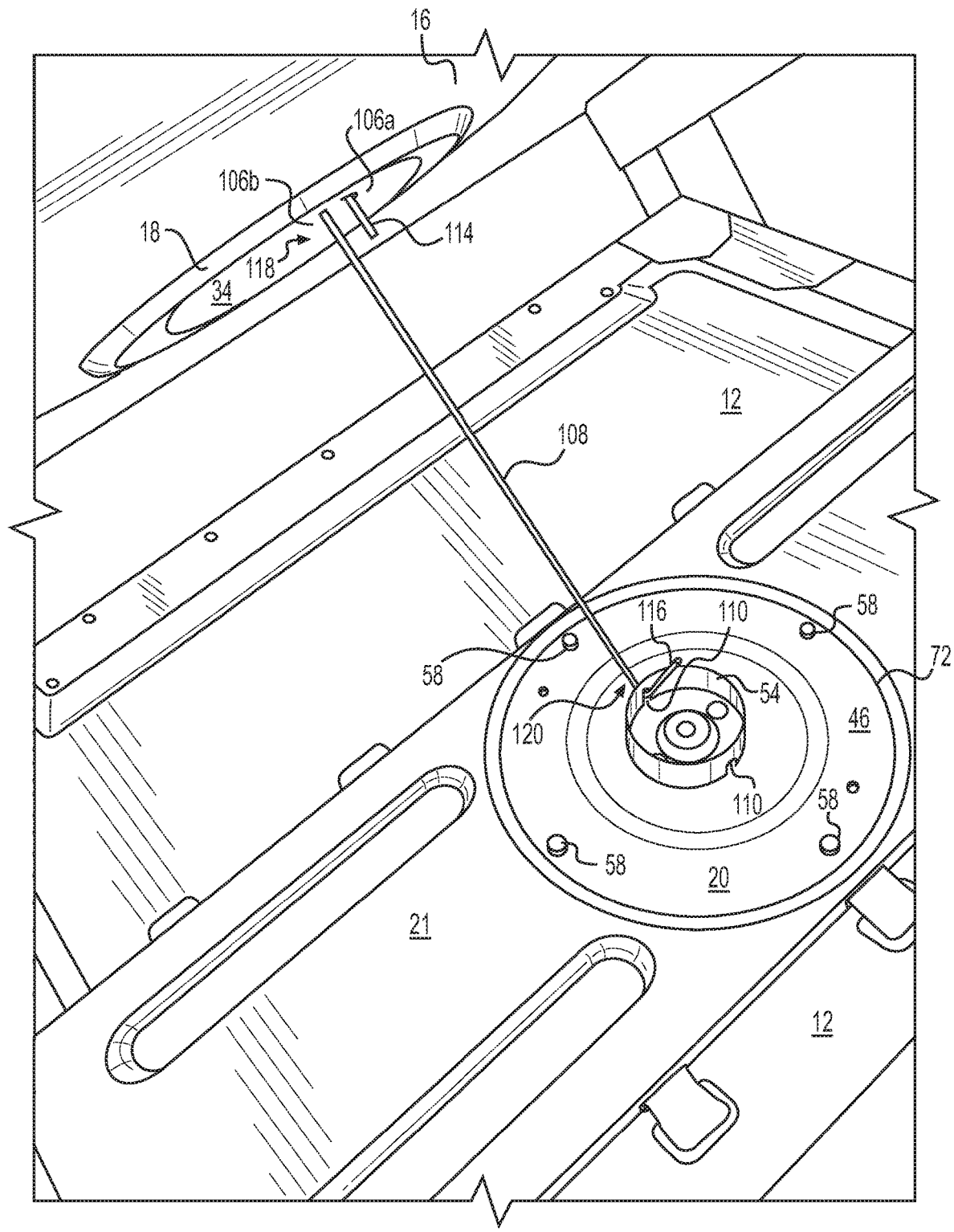
FIG. 7 is a schematic, partial, perspective view of an example system for mounting an electrical device to an electrical junction box during an example intermediate step of an example method for mounting an electrical device to an electrical junction box.

In some examples, for example, as shown in FIG. 7, one or more of the fastener slots 106 may be used as hanger apertures configured to receive a hanger 108 that may be used during assembly/installation of the system 10. For example, the coupler plate 20 may include one or more receiver apertures 110 configured to receive the hanger 108. As shown, the hanger 108 may include hooks 114 and 116 at respective opposite ends 118 and 120 of the hanger 108. The hook 114 of the hanger 108 may be coupled to the mounting plate 18, for example, via one or more of the fastener slots 106a and 106b, and the hook 116 may be coupled to the coupler plate 20, for example, via one or more of the receiver apertures 110. In the example shown, the receiver apertures 110 are provided in the flange 54 of the coupler plate 20.

Some examples of the system 10 may be assembled according to the following example method for mounting an electrical device to a junction box. The mounting plate 18 may be coupled to the junction box 14 by passing the supply wires 22 through the service aperture 40 of the base 34 of the mounting plate 18, with the first side 36 of the base 34 facing the junction box 14, and inserting one or more of the fasteners 44 through one or more of the fastener apertures 42 of the mounting plate 18 and tightening the fasteners 44. In some examples, the mounting plate 18 may be coupled to the junction box 14 in an orientation, such that one or more of alignment indicia 100 appear to indicate that the mounting plate 18 is in the desired orientation relative to another structure in the room in which the system 10 is being assembled. In some examples, side indicia 102 may be used to identify the side of the base 34 that faces the room.

Once the mounting plate 18 has been coupled to the junction box 14, the hook 114 of the hanger 112 may be engaged with the mounting plate 18, for example, via one or more of the fastener slots 106a and 106b, so that the hanger 112 is supported and hangs from the mounting plate 18. The coupler plate 20, which may be coupled either directly (or indirectly via the adaptor 21) to the electrical device 12, may be positioned near the mounting plate 18, so that the hook 116 of the hanger 112 may be engaged with the receiver aperture 110 of the coupler plate 20. Once the hook 116 is engaged with the coupler plate 20, the mounting plate 18 supports the coupler plate 20 and the electrical device 12 via the hanger 112, so that the device wires 30 may be coupled to the supply wires 22, for example, via the respective electrical connectors 28 and 32. Once the device wires 30 and supply wires 22 are coupled to one another, while supporting the coupler plate 20 and the electrical device 12, the hanger 112 may be disengaged from the mounting plate 18 and coupler plate 20, and the coupler plate 20 may be moved toward the mounting plate 18, while pushing the device wires 30 and supply wires 22 through the service aperture 40 of the base 34 of the mounting plate 18, and into the housing 24 of the junction box 14.

In some examples, the flange 54 of the coupler plate 20 may be aligned with the service aperture 40 of the mounting plate 18 and/or the pins 58 of the coupler plate 20 may be aligned with the enlarged portions 64 of the curved slots 56 of the mounting plate 18, and the first side 48 of the coupler plate 20 may be pushed against the second side 38 of the mounting plate 18, so that the flange 54 extends through the service aperture 40 and the pins 58 extend though the enlarged portions 64 of the curved slots 56. In some examples, the first side 48 of the coupler plate 20 presses against the friction clips 90 of the second side 38 of the mounting plate 18, thereby deflecting them toward the base 34 of the mounting plate 18.

Thereafter, the coupler plate 20 may be rotated or twisted, for example, in the direction indicated by the rotation indicia 104, so that the enlarged portions 70 of the pins 58 deflect the clip faces 78 of the locking clips 76 toward the center of the mounting plate 18, until the enlarged portions 70 of the pins 58 pass the apexes 79 of the clip faces 78 and pass into the respective narrow portions 65 of the curved slots 56. In some examples, as the enlarged portions 70 of the pins 58 pass into the narrow portions 65 of the curved slots 56, the enlarged portions 70 ride up the ramps 88 and onto the raised portions 86 of the base 34 of the mounting plate 18. In some examples, the raised portions 86, being on the first side 36 of the base 34, and the friction clips 90, being on the second side 38 of the base 34, provide a biasing force to reduce the likelihood (or prevent) the coupler mount 20 from moving loosely relative to the mounting plate 18, thereby tending to prevent the coupler plate 20 and electrical device 12 coupled thereto from rotating relative to the mounting plate 18, for example, unless the relative orientation of the coupler plate 20 and the mounting plate 18 is being adjusted.

Once the coupler plate 20 has been assembled to the mounting plate 18, the relative orientation of the coupler plate 20 and the mounting plate 18 may be adjusted by rotating the coupler plate 20 in order to achieve the desired alignment of the coupler plate 20 and the electrical device 12, for example, relative a structure in the room in which the system 10 is assembled (e.g., a wall). One or more of the above-noted procedures may be re-ordered.

Although this subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. A method for mounting an electrical device to a junction box, the method comprising:
    coupling a mounting plate to the junction box;
    coupling at least one electrical wire from the junction box to at least one electrical wire of the electrical device;
    moving a coupler plate coupled to the electrical device toward the mounting plate and passing at least one pin of the coupler plate at least partially through a slot in the mounting plate, such that a side of the mounting plate and a side of the coupler plate are facing one another;
    rotating the coupler plate relative to the mounting plate, such that the coupler plate and the mounting plate are engaged with one another via engagement between the at least one pin of the coupler plate and the mounting plate; and
    coupling a hanger to the mounting plate and the coupler plate to support the coupler plate from the mounting plate via the hanger before coupling the at least one electrical wire from the junction box to the at least one electrical wire of the electrical device.

2. The method of claim 1, wherein the at least one pin comprises an enlarged portion at a remote end of the at least one pin, and the at least one slot comprises an enlarged portion, and wherein passing the at least one pin of the coupler plate at least partially through the slot in the mounting plate comprises passing the enlarged portion of the at least one pin through the enlarged portion of the at least one slot.

3. The method of claim 2, wherein the mounting plate comprises at least one locking clip associated with the at least one slot, and wherein rotating the coupler plate relative to the mounting plate causes the enlarged portion of the at least one pin to pass the locking clip.

4. The method of claim 1, further comprising de-coupling the hanger from the mounting plate and the coupler plate after coupling the at least one electrical wire from the junction box to the at least one electrical wire of the electrical device.

5. The method of claim 1, further comprising adjusting the relative orientation of the electrical device relative to the mounting plate by rotating the electrical device relative to the mounting plate.

* * * * *